US 8,943,076 B2

(12) United States Patent
Stewart et al.

(10) Patent No.: US 8,943,076 B2
(45) Date of Patent: Jan. 27, 2015

(54) SYSTEM TO AUTOMATE MAPPING OF VARIABLES BETWEEN BUSINESS PROCESS APPLICATIONS AND METHOD THEREFOR

(75) Inventors: Mitchell J. Stewart, West Chester, PA (US); James T. Ahlborn, Downington, PA (US)

(73) Assignee: Dell Products, LP, Round Rock, TX (US)

( * ) Notice: Subject to any disclaimer, the term of this patent is extended or adjusted under 35 U.S.C. 154(b) by 47 days.

(21) Appl. No.: 13/366,826

(22) Filed: Feb. 6, 2012

(65) Prior Publication Data

US 2013/0204884 A1 Aug. 8, 2013

(51) Int. Cl.
*G06F 17/30* (2006.01)

(52) U.S. Cl.
CPC ................................ *G06F 17/30091* (2013.01)
USPC ......................................................... 707/755

(58) Field of Classification Search
CPC .................................................. G06F 17/30091
USPC ......................................................... 707/755
See application file for complete search history.

(56) References Cited

U.S. PATENT DOCUMENTS

| | | | |
|---|---|---|---|
| 5,299,304 A | 3/1994 | Williams et al. | |
| 5,410,675 A | 4/1995 | Shreve et al. | |
| 5,794,246 A | 8/1998 | Sankaran et al. | |
| 5,917,730 A | 6/1999 | Rittie et al. | |
| 5,953,533 A | 9/1999 | Fink et al. | |
| 6,014,670 A | 1/2000 | Zamanian et al. | |
| 6,032,158 A | 2/2000 | Mukhopadhyay et al. | |
| 6,038,590 A | 3/2000 | Gish | |
| 6,044,374 A | 3/2000 | Nesamoney et al. | |
| 6,106,569 A | 8/2000 | Bohrer et al. | |
| 6,115,690 A | 9/2000 | Wong | |
| 6,134,706 A | 10/2000 | Carey et al. | |
| 6,208,990 B1 | 3/2001 | Suresh et al. | |
| 6,223,180 B1 | 4/2001 | Moore et al. | |
| 6,339,775 B1 | 1/2002 | Zamanian et al. | |
| 6,343,275 B1 | 1/2002 | Wong | |
| 6,418,400 B1 | 7/2002 | Webber | |
| 6,626,957 B1 | 9/2003 | Lippert et al. | |
| 6,640,226 B1 | 10/2003 | Shringeri et al. | |
| 6,725,231 B2 | 4/2004 | Hu et al. | |

(Continued)

FOREIGN PATENT DOCUMENTS

| | | |
|---|---|---|
| WO | WO 02/102097 A1 | 12/2002 |
| WO | WO 2008/134627 A2 | 11/2008 |

OTHER PUBLICATIONS

Boomi Integration Platform datasheet Boomi, Inc., 2006.

(Continued)

*Primary Examiner* — Apu Mofiz
*Assistant Examiner* — Jared Bibbee
(74) *Attorney, Agent, or Firm* — Larson Newman, LLP

(57) ABSTRACT

Profiles associated with two applications are received. Each profile identifies a set of data fields identified by a corresponding full path name. Associations between data fields of the profiles are identified based on mapping pairs included in a full path mapping database, mapping pairs included in a shortest unique path mapping database, and mapping pairs included in a leaf mapping database. A prioritized list of mapping suggestions is provided based on the identified associations. A mapping suggestion can include a data manipulation operation according to information associated with a corresponding mapping pair.

20 Claims, 11 Drawing Sheets

(56) References Cited

U.S. PATENT DOCUMENTS

| | | | |
|---|---|---|---|
| 6,785,685 B2 | 8/2004 | Soetarman et al. | |
| 6,789,096 B2 | 9/2004 | Sankaran et al. | |
| 6,820,077 B2 | 11/2004 | Godfredsen et al. | |
| 6,820,135 B1 | 11/2004 | Dingman et al. | |
| 6,823,373 B1 | 11/2004 | Pancha et al. | |
| 6,848,081 B1* | 1/2005 | Yoda et al. | 715/741 |
| 6,850,947 B1 | 2/2005 | Chung et al. | |
| 6,854,107 B2 | 2/2005 | Green et al. | |
| 6,895,409 B2 | 5/2005 | Uluakar et al. | |
| 6,895,471 B1 | 5/2005 | Tse et al. | |
| 6,922,831 B1 | 7/2005 | Kroening et al. | |
| 6,988,165 B2 | 1/2006 | White et al. | |
| 6,993,743 B2 | 1/2006 | Crupi et al. | |
| 6,996,584 B2 | 2/2006 | White et al. | |
| 7,047,219 B1 | 5/2006 | Martin et al. | |
| 7,047,488 B2 | 5/2006 | Ingersoll et al. | |
| 7,117,215 B1 | 10/2006 | Kanchwalla et al. | |
| 7,162,643 B1 | 1/2007 | Sankaran et al. | |
| 7,171,647 B1 | 1/2007 | Smith et al. | |
| 7,181,457 B2 | 2/2007 | Reinauer et al. | |
| 7,216,292 B1* | 5/2007 | Snapper et al. | 715/236 |
| 7,383,215 B1 | 6/2008 | Navarro et al. | |
| 7,496,888 B2 | 2/2009 | Sanjar et al. | |
| 7,499,951 B2 | 3/2009 | Mueller et al. | |
| 7,584,192 B2 | 9/2009 | Rey et al. | |
| 7,590,724 B1 | 9/2009 | Williams | |
| 7,610,575 B2 | 10/2009 | Sproule | |
| 7,698,634 B2 | 4/2010 | Bhatia et al. | |
| 7,765,136 B2 | 7/2010 | Northington et al. | |
| 7,792,784 B2 | 9/2010 | Gupta | |
| 7,941,784 B2 | 5/2011 | Shenfield et al. | |
| 8,010,845 B2 | 8/2011 | Rui et al. | |
| 8,036,939 B2 | 10/2011 | Gil et al. | |
| 8,060,396 B1 | 11/2011 | Bessier et al. | |
| 8,095,416 B2 | 1/2012 | Harvey et al. | |
| 8,126,762 B2 | 2/2012 | Ramachandran et al. | |
| 8,165,993 B2 | 4/2012 | Broda et al. | |
| 8,271,615 B2 | 9/2012 | Ellison et al. | |
| 8,276,115 B2 | 9/2012 | Bates et al. | |
| 8,315,939 B2 | 11/2012 | Blank | |
| 8,645,367 B1* | 2/2014 | Hajaj et al. | 707/727 |
| 8,671,449 B1* | 3/2014 | Nachenberg | 726/24 |
| 2001/0052112 A1 | 12/2001 | Mohan et al. | |
| 2002/0016771 A1 | 2/2002 | Carothers et al. | |
| 2002/0073396 A1 | 6/2002 | Crupi et al. | |
| 2002/0095650 A1 | 7/2002 | Green et al. | |
| 2002/0104067 A1 | 8/2002 | Green et al. | |
| 2003/0221184 A1 | 11/2003 | Gunjal et al. | |
| 2003/0236677 A1 | 12/2003 | Casati et al. | |
| 2004/0068431 A1 | 4/2004 | Smith et al. | |
| 2004/0133876 A1 | 7/2004 | Sproule | |
| 2004/0236683 A1 | 11/2004 | Guermonprez et al. | |
| 2005/0005262 A1 | 1/2005 | Mohan et al. | |
| 2005/0165829 A1* | 7/2005 | Varasano | 707/102 |
| 2005/0198618 A1 | 9/2005 | Lalonde et al. | |
| 2005/0209903 A1* | 9/2005 | Hunter et al. | 705/9 |
| 2005/0273758 A1 | 12/2005 | Long | |
| 2006/0017947 A1 | 1/2006 | Wang et al. | |
| 2006/0161495 A1 | 7/2006 | Wigzell | |
| 2006/0184933 A1 | 8/2006 | Chessell et al. | |
| 2006/0230066 A1* | 10/2006 | Kosov et al. | 707/104.1 |
| 2007/0150385 A1 | 6/2007 | Ode | |
| 2007/0168206 A1 | 7/2007 | McCall et al. | |
| 2008/0163164 A1 | 7/2008 | Chowdhary et al. | |
| 2008/0196006 A1 | 8/2008 | Bates et al. | |
| 2008/0209078 A1 | 8/2008 | Bates et al. | |
| 2008/0270977 A1 | 10/2008 | Nucci et al. | |
| 2009/0006267 A1 | 1/2009 | Fergusson et al. | |
| 2009/0112666 A1 | 4/2009 | Guo et al. | |
| 2010/0023362 A1 | 1/2010 | Nguyen et al. | |
| 2010/0031140 A1 | 2/2010 | Cummins | |
| 2010/0061702 A1* | 3/2010 | Tanaka et al. | 386/95 |
| 2010/0070981 A1 | 3/2010 | Hadar | |
| 2010/0306709 A1 | 12/2010 | Lynch et al. | |
| 2011/0004627 A1 | 1/2011 | Reca et al. | |
| 2011/0218843 A1 | 9/2011 | Goel et al. | |
| 2011/0282715 A1 | 11/2011 | Nguyen et al. | |
| 2012/0041945 A1 | 2/2012 | Blubaugh | |
| 2012/0096279 A1 | 4/2012 | Roberts et al. | |
| 2012/0246573 A1* | 9/2012 | Arokiaswamy | 715/748 |

OTHER PUBLICATIONS

Boomi on Demand product data sheet Boomi, Inc., 2007.
Boomi AS2 Transport datasheet Boomi, Inc., 2006.
Boomi, Inc., Announces General Availability of the Boomi Integration Platform V3.0, PR Newswire, Jan. 16, 2004.
Dell Agrees to Acquire Software Firm Boomi Wall Street Journal, Nov. 3, 2010.
Silk, Scott, Automating the Balanced Scorecard Management Accounting, vol. 19, No. 11, May 1998.
Arnold, Tom, Dashboard & Scorecard Software Tools for Operations Management and Strategy Deployment Summit Media Partners, Sep. 18, 2002.
Norton, David, SAP Strategic Enterprise Management: Translating Strategy Into Action: The Balanced Scorecard SAP, May 1999.
TIBCO Staffware Process Suite product brochure TIBCO Software Inc., 2006.
Chambers, Bill et al., Real-Time Data Access Using Business Process Management VARBusiness, vol. 19, No. 23, Nov. 10, 2003.
Sturim, Robert, Achieving Competitive Advantage Through Supply Chain Integration Vitria Technology Inc., 1999.
Intalio Adds Celequest BAM Technology to Its BPMS Solution; Celequest Management Dashboards Integrated into Intalio/BPMS, Business Wire, Jan. 17, 2006.
Viane, Stijn et al., Corporate Performance Management: Beyond Dashboards and Scorecards Journal of Performance Management, vol, 20, No. 1, 2007.
Ergometrics.com web pages Ergometrics, Mar. 2000, Retrieved from Archive.org Jan. 25, 2007.
iDashes.net web pages iDashes, Inc., May 2001, Retrieved from Archive.org Jan. 25, 2007.
Performance Dashboards: Measuring, Monitoring, and Managing Your Business: Education and Research The Data Warehouse Institute, PowerPoint presentation, 2006.
Eckerson, Wayne E., Performance Dashboards: Measuring, Monitoring, and Managing Your Business: John Wiley & Sons, ISBN 13-978-0-471-724179-9, 2006.
"The Quest for a Cloud Integration Strategy," Boomi Whitepaper, 2011, http://marketing.boomi.com/QuestForCloudIntegration.html.
Oracle Internal Controls Manager 11i—Data Sheet, Oracle, Apr. 2003.
Few, Stephen, Intelligent Dashboard Design Perceptual Edge, Sep. 2005.
Resnick, Marc L., Building the Executive Dashboard, Proceedings of the Human Factors and Ergometrics Society, 47th Annual Meeting, 2003.
Evans, Owen B., Billing Score Card, University of Mississippi Medical Center, 2006.
The Financial Edge—Dashboard Guide, Blackbaud, Inc., 2011.
Bordeleau, David, Exploring Alternative Predictive Modeling Techniques to Strengthen the Customer Relationship, SAS SUGI31, Data Mining and Predictive Modeling, 2006.
Kareo.com Web pages—Dashboards, Kareo, Jan. 2010, Retrieved from Archive.org, Feb. 19, 2013.
Gonzalez, Tom, Designing Executive Dashboards—Part 1, BrightPoint Consulting, Inc., 2005.
Gonzalez, Tom, Designing Executive Dashboards—Part 2, BrightPoint Consulting, Inc., 2005.
Boomi AtomSphere, Boomi, Inc., 211 pages http://web.archive.org/web/20100429065017/http:/help.boomi.com/display/BOD/Boomi+AtomSphere+Helpboomi.com/display/BOD/Boomi+AtomSphere+Help.
Boomi AtomSphere, Boomi, Inc., 47 pages http://help.boomi.com/atomsphere/#GUID-B17ADCD8-8B85-4D68-A360-9552EAA22225.html.

(56) References Cited

OTHER PUBLICATIONS

Boomi AtomSphere web, Boomi, Inc., http://help.boomi.com/atomsphere/#GUID-B17ADCD8-8B85-4D68-A360-9552EAA22225.html.
Boomi AtomSphere Maps, Boomi, Inc., http://help.boomi.com/display/BOD/3.4+-+Building+Data+Maps.
Boomi AtomSphere API, Boomi, Inc., http://help.boomi.com/atomsphere/#GUID-C6847C47-5EFF-4933-ADA1-A47D032471C6.html.
Boomi AtomSphere Getting Started, Boomi, Inc., http://help.boomi.com/atomsphere/GUID-43F13F31-E82A-4AF8-BE49-9213D4715411.html#GUID-B522EE93-E8A2-43CC-9D3E-EF37371AEF32.html.
Boomi AtomSphere Core Terms, Boomi, Inc., http://help.boomi.com/atomsphere/GUID-CD1886F1-DCAC-41C1-A255-4287B78A2DE7.html.
Dell Boom AtomSphere Fall Release Harnesses Power of World's Largest Integration Cloud to Simplify Integration Complexity; http://www.boomi.com/news_and_events/press_releases/25102011.
Boomi AtomSphere Help, Boomi, Inc., Apr. 29, 2010 web.archive.org/web/20100429065017/http://help.boomi/display/BOD/Boomi+AtomSphere+Help.
Boomi AtomSphere Build, Boomi, Inc., Apr. 29, 2010 web.archive.org/web/20100429041219/http://help.boomi/display/BOD/3+-+Build.
Boomi AtomSphere Building Connectors, Boomi, Inc., May 10, 2010 web.archive.org/web/20100510115902/http://help.boomi/display/BOD/3.2+-+Building+Connectors.
Boomi AtomSphere Building Processes, Boomi, Inc., Dec. 12, 2009 web.archive.org/web/20091212010359/http://help.boomi/display/BOD/3.1+-+Building+Processes.
Boomi AtomSphere Manage, Boomi, Inc., Apr. 30, 2011 web.archive.org/web/20110430060121/http://help.boomi/display/BOD/5+-+Manage.
Boomi AtomSphere Monitoring Atoms, Boomi, Inc.,Nov. 9, 2010 web.archive.org/web/20101109011443/http://help.boomi/display/BOD/5.1+-+Monitoring+Atoms.
Boomi AtomSphere Executing a Process, Boomi, Inc., Nov. 9, 2010 web.archive.org/web/20101109025104/http://help.boomi/display/BOD/5.2+-+Executing+a+Process.
Boomi AtomSphere Viewing Process Executions, Boomi, Inc., Nov. 9, 2010 web.archive.org/web/20101109011449/http://help.boomi/display/BOD/5.3+-+Viewing+Process+Executions.
Boomi AtomSphere Atom Management, Boomi, Inc., May 19, 2011 web.archive.org/web/20110519171500/http://help.boomi/display/BOD/5.4+-+Atom+Management.
Boomi AtomSphere The Boomi Atom, Boomi, Inc., Jun. 13, 2010 web.archive.org/web/20100613115315/http://help.boomi/display/BOD/8+-+The+Boomi+Atom.
SAP Solution Manager: Solution Monitoring—Active Global Support SAP 2005.
Using Business Activity Monitoring ES Dashboard, Adobe LiveCycle ES Version 8.0 Adobe, Jul. 2007.
IBM FileNet P8, Version 5.0—Help web pages IBM, Nov. 2010.
SAP Solution Manager 3.1: Strategic Background and Functional Overview SAP 2003.

* cited by examiner

SYSTEM TO AUTOMATE MAPPING OF VARIABLES BETWEEN BUSINESS PROCESS APPLICATIONS AND METHOD THEREFOR

CROSS REFERENCE TO RELATED APPLICATIONS

Related subject matter is contained in co-pending U.S. patent application Ser. No. 12/110,607 entitled "System and Method For Automated On-Demand Creation of a Customized Software Application," filed on Apr. 28, 2008, the disclosure of which is hereby incorporated by reference.

Related subject matter is contained in co-pending U.S. patent application Ser. No. 13/333,517 entitled "System to Automate Development of System Integration Application Programs and Method Therefor," filed on Dec. 21, 2011, the disclosure of which is hereby incorporated by reference.

FIELD OF THE DISCLOSURE

This disclosure generally relates to information handling systems, and more particularly relates to automating mapping of variables between business process applications.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Today, most business enterprises have sophisticated computing systems that are used both for internal operations, and for communicating outside the enterprise's network.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
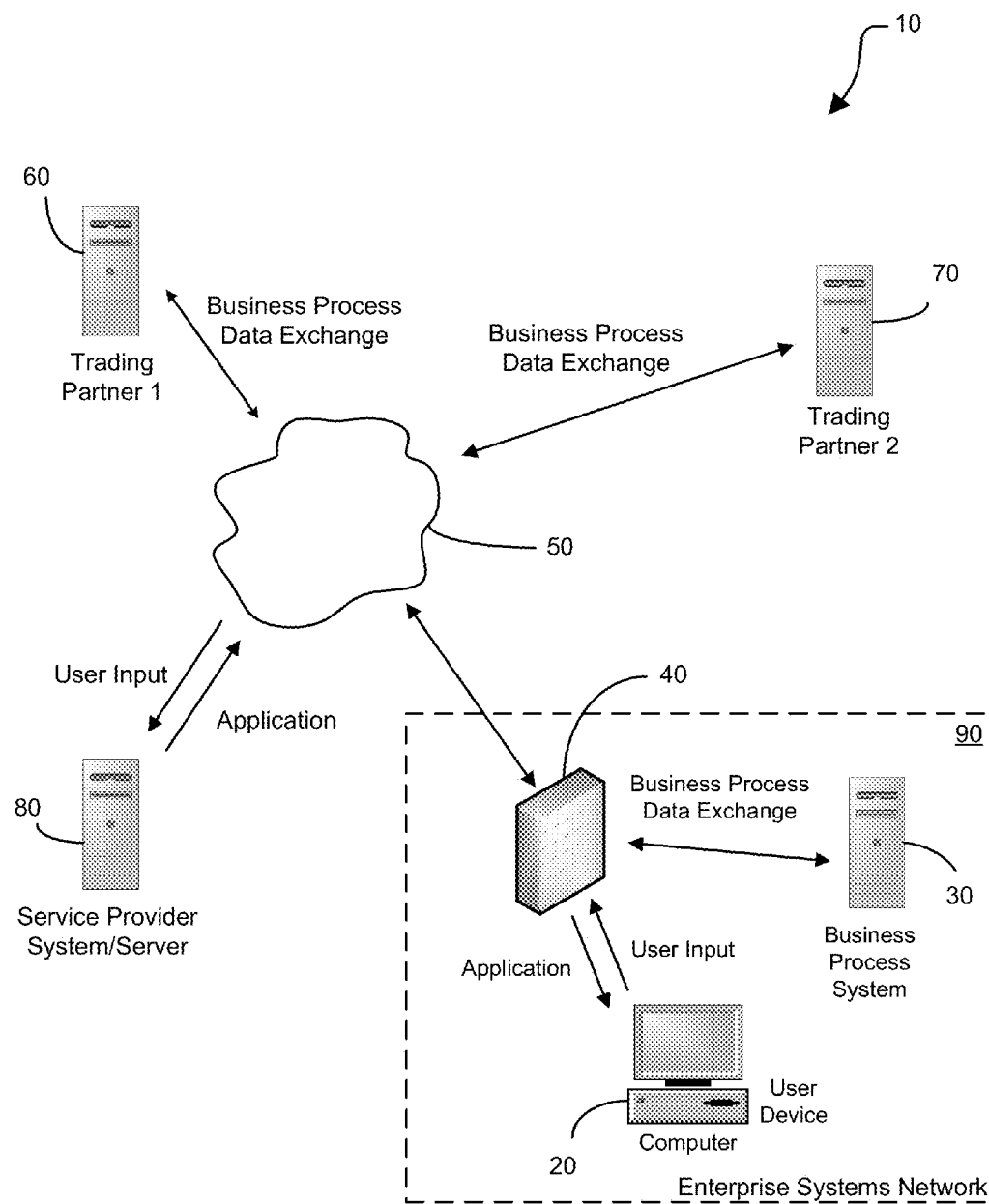
FIG. 1 is a block diagram illustrating a distributed business network system according to an embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client/server architectures, or middleware server architectures and associated components.

Today, most businesses and other enterprises have sophisticated computing systems that are used for facilitating internal operations and for communicating outside the enterprise's network, for example, to exchange information with business partners. Much of present day information exchange is conducted electronically, via communications networks, both internally to the enterprise, and among enterprises. Accordingly, it is often desirable or necessary to exchange information/data between distinctly different computing systems, computer networks, software applications, etc. The enabling of communications between diverse systems/networks/applications in connection with the conducting of business processes is often referred to as business process integration. In the business process integration context, there is a significant need to communicate between different software applications/systems within a single computing network, e.g. between an enterprise's information warehouse management system and the same enterprise's purchase order processing system. There is also a significant need to communicate between different software applications/systems within different computing networks, e.g. between a buyer's purchase order processing system and a seller's invoicing system.

Relatively recently, systems have been established to enable exchange of data via the Internet, such as via web-based interfaces for business-to-business and business-to-consumer transactions. For example, a buyer may operate a personal computer (PC) to connect to a seller's website to manually enter data using a web interface provided by the seller's computing system. In higher volume environments, a buyer may use an executable software application known as Electronic Data Interchange (EDI) Software, or Business-to-Business Integration Software to connect to the seller's computing system and to deliver electronically a business document, such as a purchase order, without requiring human intervention to manually enter the data. Such software applications are readily available in the market today. These applications are typically purchased from software vendors and installed on a computerized system owned and maintained by the business, in this example the buyer. The seller will have a similar/complementary software application on its system, so that the information exchange may be completely automated in both directions. In contrast to the system presently disclosed, these applications are purchased, installed and operated on the user's local system. Thus, the user typically owns and maintains its own copy of the system, and configures the application locally to connect with its trading partners.

In both the traditional and more recent approaches, the executable software application is universal or generic as to all trading partners before it is received and installed within a specific enterprise's computing network. In other words, it is delivered to different users/systems in an identical, generic form. The software application is then installed within a specific enterprise's computing network, which may include data centers, etc. physically located outside the physical boundaries of the enterprises. After the generic application is installed, it is then configured and customized for a specific trading partner. The customized application can be executed to exchange data between the specific trading partner and the enterprise. For example, Wal-Mart may provide on its website specifications of how electronic data such as Purchase Orders and Invoices must be formatted for electronic data communication with Wal-Mart, and how that data should be communicated with Wal-Mart. A supplier/enterprise is then responsible for finding a generic, commercially-available software product that will comply with these communication requirements and configuring it appropriately. Accordingly, the software application will not be customized for any specific supplier until after that supplier downloads the software application to its computing network and configures the software application for the specific supplier's computing network, etc. Alternatively, the supplier may engage computer programmers to create a customized software application to meet these requirements, which is often exceptionally time-consuming and expensive.

FIGS. 1-7 illustrate a system and method for automating development of customized system integration application programs. A web-based graphical interface is used to visually model a business process via a flowcharting process. During this modeling process the user selects from a predetermined set of process-representing visual elements that are stored on a remote server, such as the web server. For example, an enterprise can define an integration system to enable bi-directional exchange of data between internal applications, between internal applications and external trading partners, or between internal applications and applications running external to the enterprise. Applications running external to the enterprise are commonly referred to as Software as a Service (SaaS). Each integration process represents a complete end-to-end interface. For example, a process could be modeled to accept a purchase order (PO) from a retailer such as Wal-Mart, transform the PO into a format recognizable by a certain internal order management software application of the enterprise, and then insert the contents of that PO directly into the enterprise's order management system.

The automated development system generates custom software to provide the desired interoperability as defined by the integration flowchart. The custom software may be packaged within a container program, also referred to herein as a dynamic runtime engine. The dynamic runtime engine may be an executable software application capable of running on a computer within the enterprise's network, which may include, for example, networks owned and/or operated by third party data center providers, such as OpSource, Amazon, etc. When started by a user, the executable software application connects to the automated development system and downloads an Extensible Markup Language (XML) representation of the visual model representing the integration process, and all requisite code needed to run the integration process. The required code includes a generic application template, selected predefined code sets that are selected as a function of the user's needs as defined by the modeled process, and a data code set that includes input provided by the user for customizing the stock components for a specific integration process. Additional components may be retrieved as required. As changes are made to this model, via the website, or to the code that executes the model, the executable software application will automatically check for and apply these changes as needed without requiring human intervention.

FIG. 1 shows a distributed business network system 10 including conventional information handling systems of a type typically found in client/server computing environments. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

More specifically, the system 10 includes a conventional user/client device 20, such as a desktop PC, enabling a user to communicate via a communications network 50, such as the Internet. The exemplary user device 20 may be configured with conventional web browser software. The web browser, such as Microsoft Corporation's Internet Explorer web browser software, allows the user to interact with websites via the network 50. The client device 20 is positioned within an enterprise network 90 behind an enterprise network's firewall 40. For illustrative purposes, the enterprise network 90 includes a business process system 30, which may include conventional computer hardware and commercially available Enterprise Resource Planning (ERP) and other business process software, such as QuickBooks, SAP's MySAP ERP, Oracle's OneWorld JD Edwards ERP, Infor's WMS application, and the like. The system 10 further includes trading partner systems 60 and 70 for receiving and/or transmitting data relating to business-to-business transactions. For example, Wal-Mart may operate trading partner system 60 to allow for issuance of purchase orders to suppliers and to receive invoices from suppliers in electronic data form as part of electronic data exchange processes of a type well known in the art.

The system and methods disclosed herein allow an enterprise to obtain the capabilities needed to conduct the electronic exchange of data with one or more trading partners, internal applications, or applications available via the Internet, commonly referred to as Software as a Service. The present disclosure provides these capabilities in a unique fashion by providing the enterprise with a software application including the configuration information required for conducting the integration process, and also the executable code needed to make the process run, and specially configuring this application to run within the enterprise's network, for example, behind the firewall of the enterprise or within a third-party-hosted data center, etc., that is considered to be part of the enterprise's network so that it may connect to various software applications running internal to the enterprise's network.

In accordance with the present disclosure, a provider of a service (service provider) for creating on-demand, real-time creation of customized software applications operates a service provider server/system 80 within the network 10. The system 80 may be specially configured in accordance with the present disclosure, and may be capable of communicating with devices in the enterprise's network 90. It should be noted that the communication between system 80 and network 90 is essentially unidirectional in that communications/communication sessions originate from network 90 to system 80, and not from system 80 to network 90. Accordingly, the network 90 need not have its firewall 40 modified to allow incoming traffic from communications sessions originating from system 80.

The automated development system may be configured in accordance with the present disclosure to provide web server functionality for presenting a user-accessible website. Communications between the user device 20 and the system 80 website may be performed using conventional communications technologies, such as the HTTPS protocol. The website may be specially configured to provide a graphical user interface providing a visual designer environment permitting a user to define process flows between applications/systems, such as between trading partner and enterprise systems, to model a customized business integration process. The graphical user interface may be used by different enterprises/customers of the service provider. The interface provides a menu of pre-defined user-selectable visual elements, and permits the user to arrange them as appropriate to model a process. The elements may include visual, drag-and-drop icons representing specific units of work required as part of the integration process, such as invoking an application-specific connector, transforming data from one format to another, routing data down multiple paths of execution by examining the contents of the data, business logic validation of the data being processed, etc. Information and computer executable instructions for presenting such a graphical user interface are stored in a memory of the service provider system 80.

The graphical user interface allows the user to provide user input providing information relating to trading partners, activities, enterprise applications, enterprise system attributes, and/or process attributes that are unique to the end-to-end business integration process of a specific enterprise. For example, the graphical user interface may provide drop down or other user-selectable menu options for identifying trading partners, application connector and process attributes/parameters/settings, etc., and dialog boxes permitting textual entries by the user, such as to describe the format and layout of a particular data set to be sent or received, for example a Purchase Order.

Figure 2:
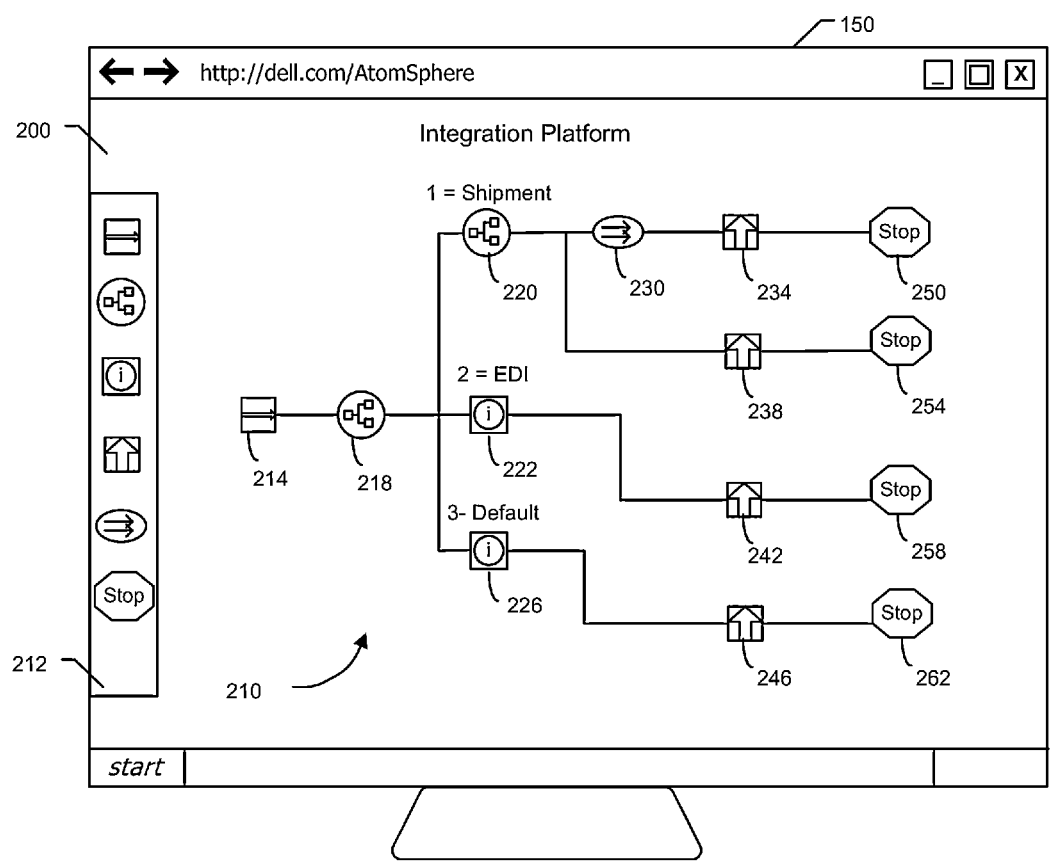
FIG. 2 illustrates a graphical user interface of a method for developing a system integration application program according to an embodiment of the present disclosure.

By way of illustrative example, the website interface may provide a visual menu of elements in a drag-and-drop environment permitting the user to create a visual model of business process activities desired to be handled by the customized software application. For example, this may involve a user's identification of receipt of purchase orders as an activity, or of issuance of invoices as an activity. By way of illustrative example, FIG. 2 shows a graphical user interface 200 of an integration platform displayed within a web browser window 150. The exemplary graphical user interface 200 displays an exemplary business process integration model 210 in the form of a flow diagram modeling a shipment order business process. The visual model may be created by a user within the visual designer environment, via the website interface provided by the system 80.

The exemplary flow diagram of FIG. 2 includes an Inbound connector element 214, Routing process elements 218 and 220, Document Property elements 222 and 226, Data Transformation process element 230, Outbound connector elements 234, 238, 242, and 246, and Process End elements 250, 254, 258 and 262. Various ones of these elements are selected from a menu 212 of elements and arranged by the user relative to one another as appropriate to model a corresponding business process. The elements may require data input from a user. For example, the inbound connector element 214 selected from the menu by the user may be configured by the user for a specific enterprise and process by the user's selection of the element and completing dialog boxes, selecting menu items, etc. as appropriate. For example, the user may provide as input for configuring data entry element 214 that the data will be inbound from an SAP system. This may be performed via a data entry field displayed in the window upon selection of data entry element 214. The element, in combination with any required data input, may be associated with a specific Connector code set stored in the memory of the system 80. The outbound connector elements may be similarly configurable. For example, the last step of the integration process may involve sending shipping order data to Company X system. The Shipping Order will be prepared as an XML message, which is a readily recognizable format. The XML message is then sent to the outbound connector, and the outbound connector converts the XML message from this simple, recognizable format into the proprietary format that is understood by the SAP system. This conversion, and the need for it, is transparent to the user configuring the integration process.

By way of further example, the routing element may require input for routing logic to be applied; the Document Properties element may require input for file naming, file storage location, etc. to be applied. There may be other elements as appropriate or necessary for modeling business processes, as desired.

Each branch of the flow diagram represents an end-to-end business process to be integrated. In the example of FIG. 2, the first (top-most) branch may model a process involving receipt of data from an SAP system in a corresponding format, routing the data according to prescribed logic (for example, 1=shipment), further routing according to further logic, transforming the data from the SAP system format to the destination system format by Data Transformation process element 230 to create an appropriately formatted XML document, and then transmitting the transformed data to the destination system in accordance with the properties and attributes of the outbound application connector 234. Examples of other common activities include synchronizing customer data between applications, synchronizing product information between applications, notification of receipt of goods ordered by a retailer, receipt of a work related injury claim, and many others.

Documents that are read into or sent out of a business process, such as the business process of FIG. 2, are each associated with a data profile. A data profile associated with a document, or with an application as a whole, includes the names of data fields included in the document. The data profile also can describe the layout or format of respective documents. For example, a data profile can include delimiters or column positions, data types, minimum/maximum string lengths, and the like. Profiles are most notably used in association with data maps. Data maps describe how information can be transferred from one document to another. For example, to transfer information included at an XML document to a flat file, the format of each document can be encoded using a respective data profile. Additionally, an application can use a data profile to inspect a corresponding document. Accordingly, a data maps include a source data profile, a destination data profile, and mapping information indicating a correspondence between each fields of the source data profile and a respective field of the destination data profile.

Figure 3:
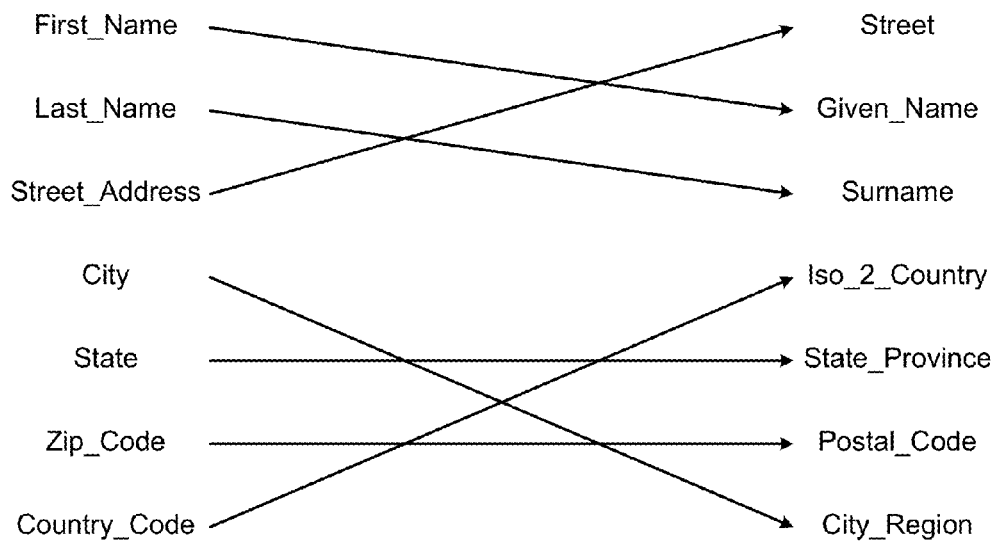
FIG. 3 is a block diagram illustrating a data map according to an embodiment of the present disclosure.

FIG. 3 shows a data map 300 according to an embodiment of the present disclosure. The data map 300 includes data fields 310 included at a first software application, labeled Application A, and data fields 320 included at a second software application, labeled Application B. Each data field represents a variable that can be associated with a value. For example, the data fields 310 include variables First_Name, Last_Name, Stree_Address, City, State, Zip_Code, and Country_Code. The data fields 320 include Street, Given_Name, Surname, Iso_2_Country, State_Province, Postal_Code, and City_Region. In an embodiment, a user of the business process integration platform graphical user interface 200 can manually generate a data map.

In an embodiment of the present disclosure, a user may drag and drop individual fields associated with a source data profile to a corresponding field of a destination data profile, as indicated by the arrows of FIG. 3. For example, the variable First_Name of Application A has been mapped to the variable Given_Name of Application B. The service provider 80 of FIG. 1 may use the data map 300 to generate and configure a system integration application program that will implement a customer's business process, such as the business process integration model 210 of FIG. 2. In another embodiment, the generation of a data map may be partially or fully automated based on information stored at a mapping database.

Figure 4:
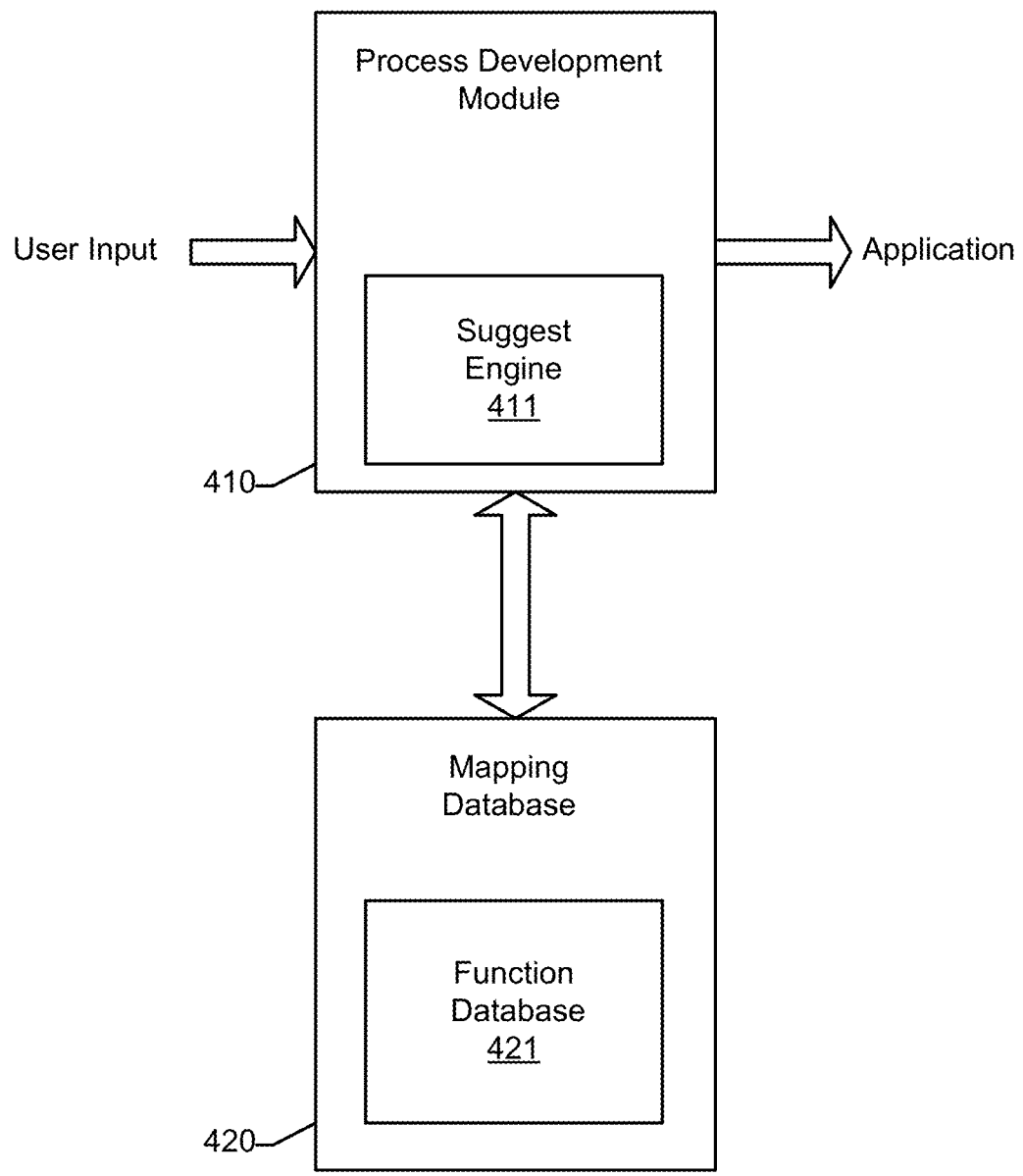
FIG. 4 is a block diagram illustrating a data map automation system according to an embodiment of the present disclosure.

FIG. 4 shows a data map automation system 400 in accordance with a specific embodiment of the present disclosure. The system 400 includes a process development module 410 and a mapping database 420. In other embodiments, the process development module 410 may include a suggest engine 411 and the mapping database 420 may include a function database 421. The process development module 410 may be implemented at the service provider 80 of FIG. 1, and may include hardware, software, or a combination thereof. The process development module provides the graphical user interface 200 of FIG. 2, through which a user may symbolically describe a desired business model. The module 410 is further operable to generate a plurality of code sets to render the specified system integration features as previously described with reference to FIG. 2.

The suggest engine 411 is configured to provide data mapping suggestions based on a history of previously encountered mappings. For example, a user may instantiate a data mapping element at the interface 200 to specify associations between data fields included in one application and data fields of another application, such as described with reference to FIG. 3. In an embodiment, a record of this mapping may be stored at the mapping database 420. Additional data maps and individual associations provided by other, subsequent, users may also be stored at the mapping database 420. Over time, the mapping database 420 may grow to include a large number of mappings corresponding to a large number of source and destination application interfaces. In one embodiment, mapping information can be stored at the mapping database 420 in the context of a corresponding application. In another embodiment, individual associations are stored at the mapping database 420 without including a record indicating the identity of the corresponding applications. For example, the mapping database can include a collection of individual associations which identify a relationship between one variable name and another variable name.

In an embodiment, the process development module 410, and the suggest engine in particular, can query the mapping database 420 to determine if the map database includes mapping information (indexes) suitable for implementing a system integration process presently under development. In the event that the mapping database 420 includes suitable mapping information, the suggest engine 411 can either generate a code set to implement a complete data map based on the stored information, or the suggest engine 411 can provide recommendations of specific map associations to a user of the integration development platform based on the stored information. In the event that the mapping database 420 include multiple, but different, mapping associations for a particular destination variable, the suggest engine 411 can select a preferred association to a particular source variable. Alternatively, the suggest engine 411 can provide a prioritized list of association suggestions to the user based on various selection and ranking criteria. For example, a preferred mapping association may be selected based on the number of times a particular association has been identified in previously encountered system integration process models. For another example, a list of mapping suggestions can be prioritized based on a degree to which names of variables match the names of variables included at the mapping database 420. Thus, mapping suggestions can be presented to a user based on a level of confidence that the suggest engine 411 associates with each of a set of indexes. The operation of the suggest engine 411 is described in further detail below with reference to FIG. 7.

Mapping information stored at the mapping database 420 can include map function information. A map function allows data to be modified as it moves from source element(s) to destination element(s). A map function specifies a data manipulation operation that is to be performed on the value of variables as the variables are transferred from one application to another. Map functions can include string manipulations, numerical manipulations, combining the values of two or more source fields to be stored at a single destination field, splitting the value of a source variable and storing respective portions of the value at two or more destination fields, and the like. Map functions can include simple data manipulations such as string truncation, or can be complex. For example, a map function can be represented by a software program such as a Java script. In an embodiment, a map function can acquire or set document properties, or process properties, associated with one or more applications. For example, a map function can initiate access of information from a database, such as from an SQL database, determine a current date, and the like. Variables defined by map functions can be accessed by other map functions. Map function information can be stored at the function database 421 and can be associated with corresponding data maps or can be associated with individual mapping associations.

Figure 5:
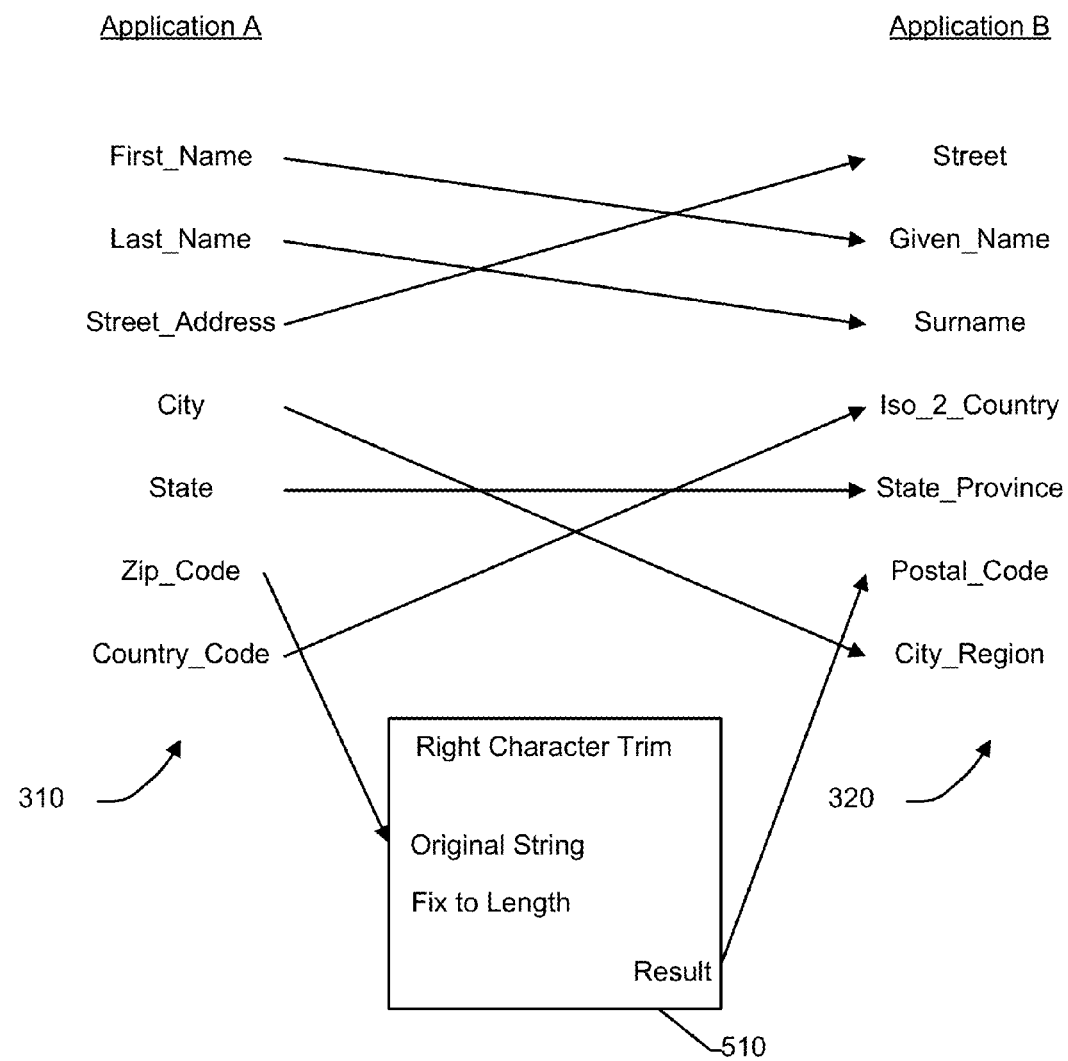
FIG. 5 is a diagram illustrating a data map including a map function according to an embodiment of the present disclosure.

FIG. 5 shows a data map 500 including a map function according to an embodiment of the present disclosure. The data map 500 is similar to the data map 300 of FIG. 3, but includes a single map function 510. The map function 510 specifies a truncation operation to be performed on the value of the variable Zip_Code when the value is transferred from application A to application B. For example, the Zip_Code field of application A may be defined to include an eleven character value, such as 78735-0356, while the field Postal_Code filed of application B is limited to a traditional five character value. Accordingly, the map function 510 is configured to perform a Right Character Trim operation, providing the value 78735 to application B.

Map functions allow conversion logic to be applied to individual values as they are being mapped. For example, the user may want to convert a character to uppercase, change the format of a date, or look up a value in a database. There are two main types of functions: Standard functions and User defined functions. Standard functions perform a single step, such as converting a value to uppercase. User Defined functions enable sophisticated transformations by allowing the user to link multiple standard functions steps together, which can be saved as standalone components and reused. Map Functions allow conversion logic to be applied to individual values as they are being mapped. For example, the user may want to convert a character to uppercase, change the format of a date, or look up a value in a database.

Functions can include string functions, numeric functions, date functions, lookup functions, custom scripting functions, connector functions, properties functions, and the like. The Right Character Trim function described above with reference to FIG. 5 is an example of a string function. An example of a numeric function is a Math Ceiling function, which rounds the value of an input variable up to the nearest whole number, for example 1.2→2.0. An example of a date function is a Date Format function, which reformats a date value associated with a source element into a format compatible with a destination element. For example, a variable associated with a date at a source document may utilize a date format YYYYMMDD while a corresponding variable at a destination document may instead have a format MMDDYYYY or MMDDYY. The Date Format function modifies the value of a date variable as it passes from a source application to a destination application.

An example of a lookup function is a SQL Lookup, which executes a static or dynamic select-query against a database. This function is typically used to perform cross reference lookups or obtain supplemental data. A custom scripting function can be configured to perform complex manipulations using JavaScript, Groovy syntax, or another programming language or scripting language. An example of a connector function is a Connector Call function, which perform a call out to any application connector. Like the lookup function, the Connector Call function is typically used to perform cross reference lookups or obtain supplemental data. Property functions include Set Process Property, Get Process Property, and the like, which are used to set and retrieve, respectively, the value of a process property. Process properties are name/value pairs or variables that can be used to store arbitrary information to assist with the process development module 410 with generating an integration code set. The properties have execution scope, meaning once set they remain available for the duration of the current process execution. This also means the properties are available across other processes initiated via a Process Call step, as is common in parent/child process designs.

User defined map functions allow multiple standard functions to be linked together. For example, a user could configure a process to get the current date in one step, and change the format in a second step. Once created, the user defined map function can be reused just like standard functions. A custom scripting map function allows a user to specify sophisticated field level transformations as well as implement conditional (if/else) field mapping. Custom scripting map function steps can be added directly to a map or used within a user defined function. The suggest engine 411 can be configured to provide standard or user defined map function recommendations based on a desired level of assistance and based on the applicability of functions stored at the function database 421.

Figure 6:
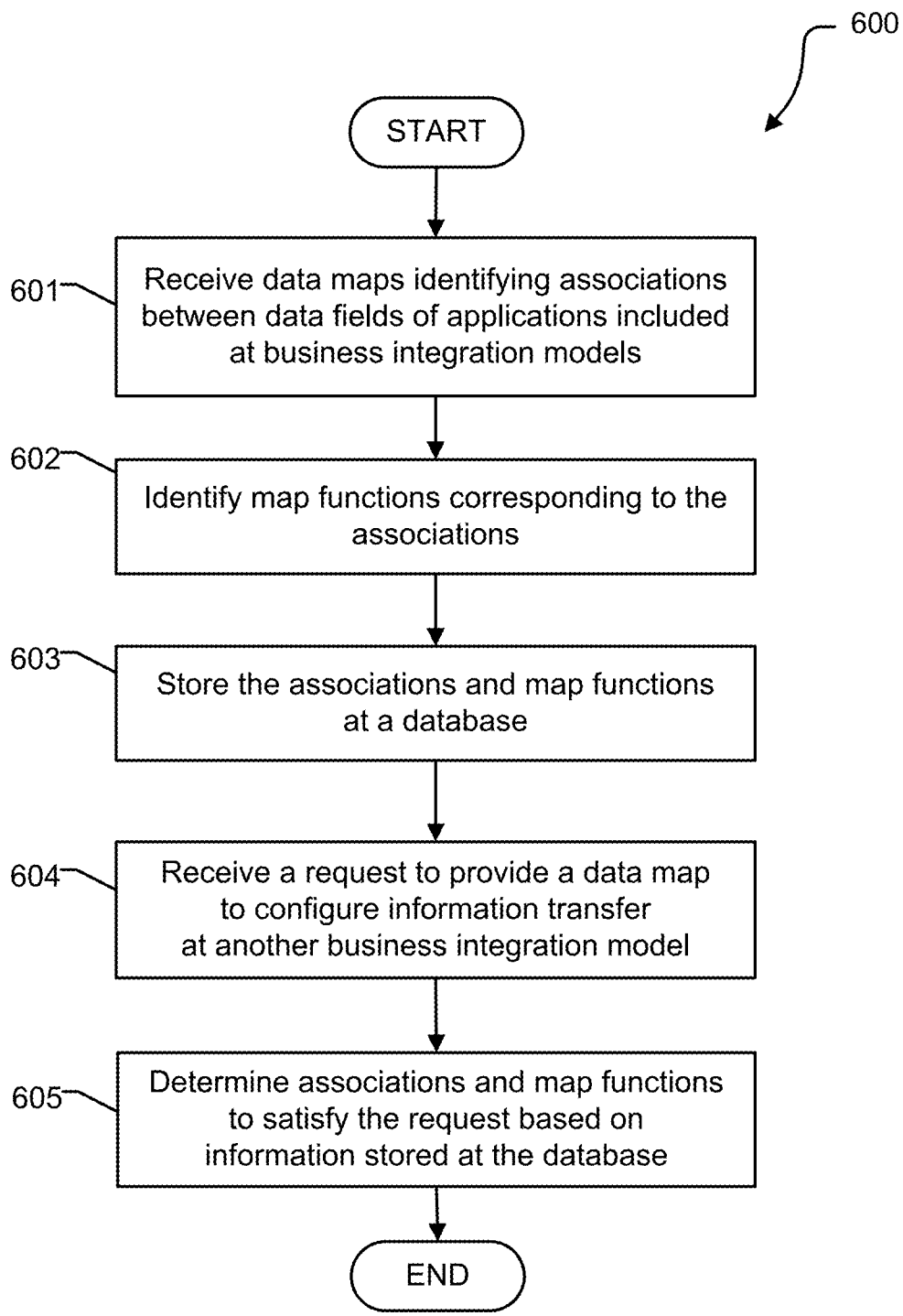
FIG. 6 is a flow diagram illustrating a method according to an embodiment of the present disclosure.

FIG. 6 shows a method 600 in accordance with an embodiment of the present disclosure. The method 600 shows how a database containing data map associations and map functions can be created and subsequently queried to provide mapping solutions or suggestions for a new business integration process model that is being developed. The flow begins at block 601 where data maps identifying associations between data fields of applications included at a plurality of business integration models are received. For example, a user can generate a symbolic representation of a business process using the graphical user interface 200 provided by a service provider 80. The business process can include a data map specifying how information included at one application can be mapped to another application. The flow proceeds to block 602 where map functions corresponding to the associations are identified. The flow proceeds to block 603 where the associations and corresponding map functions are stored at a database, such as the mapping database 420 of FIG. 4. The flow proceeds to block 604 where a request to provide a data map to configure information transfer at another business integration model is received. For example, another user of the integration platform at the service provider 80 may provide a process model specifying the transfer of information from one application to another. The user may request assistance in generating a data map and associated map functions to implement the data transfer. The flow proceeds to block 605 where associations and map functions that satisfy the request are determined based on mapping information stored at the database. For example, the suggest engine 411 of FIG. 4 can identify associations and map functions included at the mapping database 420 and function database 421 that best match the needs of the business integration system presently under development, and present suggestions of how best to implement the application interface based on based on the stored information.

Figure 7:
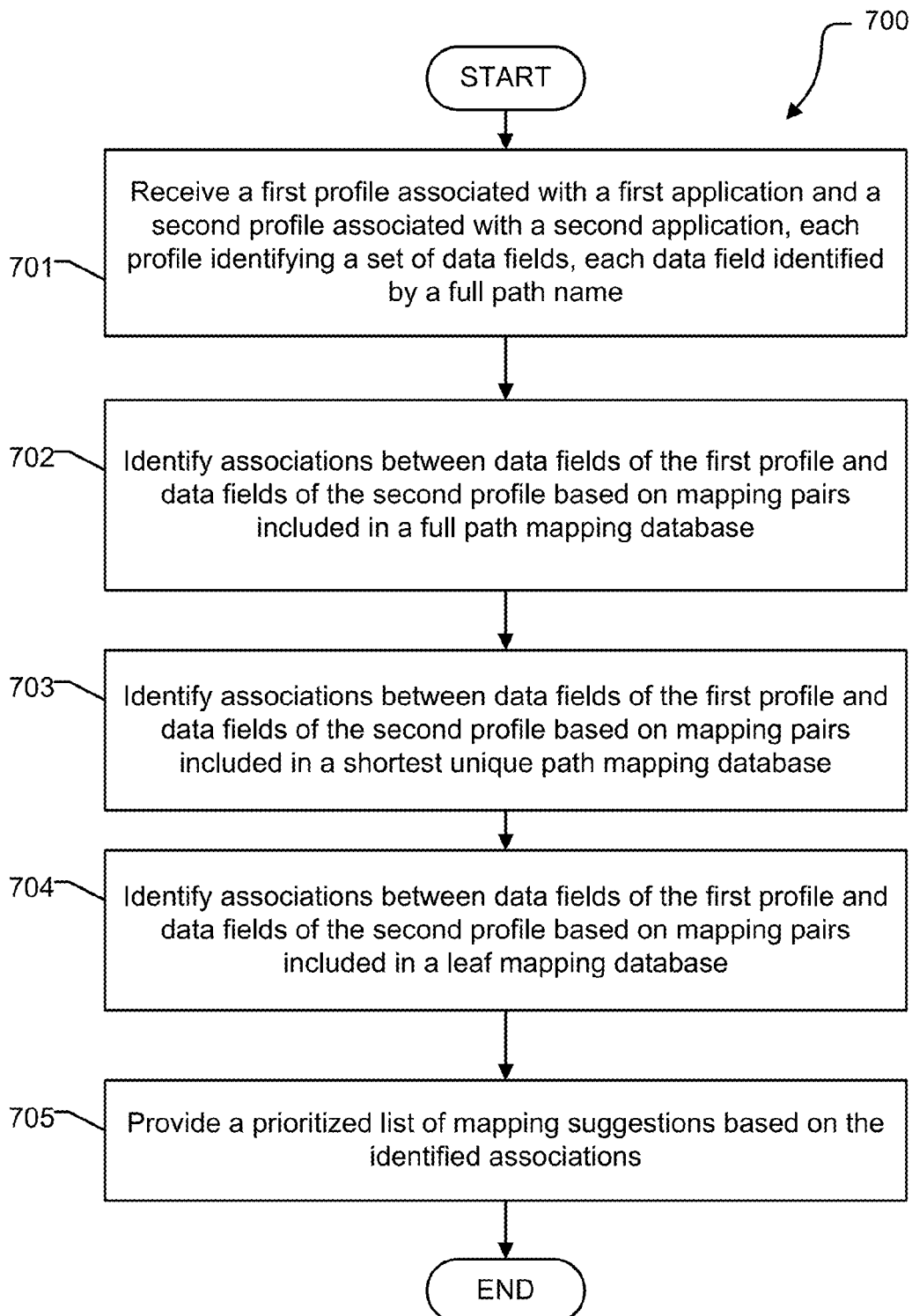
FIG. 7 is a flow diagram illustrating another method according to an embodiment of the present disclosure.

FIG. 7 shows a method 700 in accordance with an embodiment of the present disclosure. The method 700 can be implemented by the suggest engine 411 of FIG. 4. Data fields included at applications can be represented by a data structure. For example, a hierarchical relationship between variables can be represented using XML protocol. A hierarchical structure can also be represented using a string including multiple sub-strings separated by delimiters, such as a comma-separated list. A collection of data fields associated with an application is included at a data profile. The suggest engine 411 is configured to recommend mapping associations between source and destination applications based on entries included at the mapping database 420, where the entries represent associations previously implemented by other users of the process development module 410.

The method 700 begins at block 701 where a first profile associated with a first application and a second profile associated with a second application is received. Each profile identifies a set of data fields and each data field is identified by a full path name. For example, a variable associated with a source application can be referenced by string, such as a comma-separated list. The full path name includes the comma-separated string in its entirety. Examples of full path variable names included in an application profile are:
CLIENT,CONTACT,NAME;
CLIENT,CONTACT,ADDRESS,STATE;
CLIENT,COMPANY,NAME; and
CLIENT,COMPANY,ADDRESS,STATE
Where each data field, identified by a corresponding full path name, can be associated with a value.

The flow proceeds to block 702 where associations between data fields of the first profile and data fields of the second profile are identified based on mapping pairs included in a full path mapping database. The full path mapping database includes mapping pairs, each mapping pair specifying an association between a data field included in one application and a data filed included in another application. The suggest engine 411 can search the full path mapping database to determine whether the database includes a mapping pair specifying an association between a full path name included in the first profile and a full path name included in the second profile. If such a mapping pair is identified, the data map automation system 400 can recommend that particular mapping. Full path mapping is described in detail with reference to FIG. 8.

The flow proceeds to block 703 where associations between data fields of the first profile and data fields of the second profile are identified based on mapping pairs included in a shortest unique path mapping database. The shortest unique path mapping database includes mapping pairs specifying a relationship between two strings, where the strings can include only a portion of substrings included in a full path variable name found in application profiles. Shortest unique path mapping is described in detail with reference to FIG. 9.

The flow proceeds to block 704 where associations between data fields of the first profile and data fields of the second profile are identified based on mapping pairs included in a leaf mapping database. The leaf mapping database includes mapping pairs specifying a relationship between two strings, where the strings can include only a single leaf substring included in a full path variable name found in application profiles. A leaf substring refers to the right-most substring of a delimiter separated list. Leaf path mapping is described in detail with reference to FIG. 10.

The flow proceeds to block 705 where the suggest engine can provide a prioritized list of mapping suggestions based on the identified associations. The prioritized list can include more than one mapping recommendations based on the full path mapping database, the shortest unique path mapping database, the leaf path mapping database, or a combination thereof. For example, one mapping suggestion can be provided based on a mapping pair identified in the full path mapping database, while two alternative mapping suggestions can be provided based on mapping pairs identified in the shortest unique path mapping database. Each suggestion can be assigned a corresponding confidence factor based on predetermined prioritization criteria. For example, a suggestion based on a full path match can be assigned a higher confidence than a mapping based on a shortest unique match. Similarly, alternative suggestions identified using the shortest unique path database can be assigned confidence values corresponding to the number of times each respective mapping pair was found in the database. A user of the data map automation system 400 can select one of the suggested mappings based on the provided confidence values or based on other criteria. Furthermore, having selected a desired mapping, or a set of mappings associated with two profiles, a user of the system 400 can register the selected mappings whereby the mapping database 420 is updated to reflect the user's selections. Therefore, future users of the system 400 can benefit from the experience of previous users.

Figure 8:
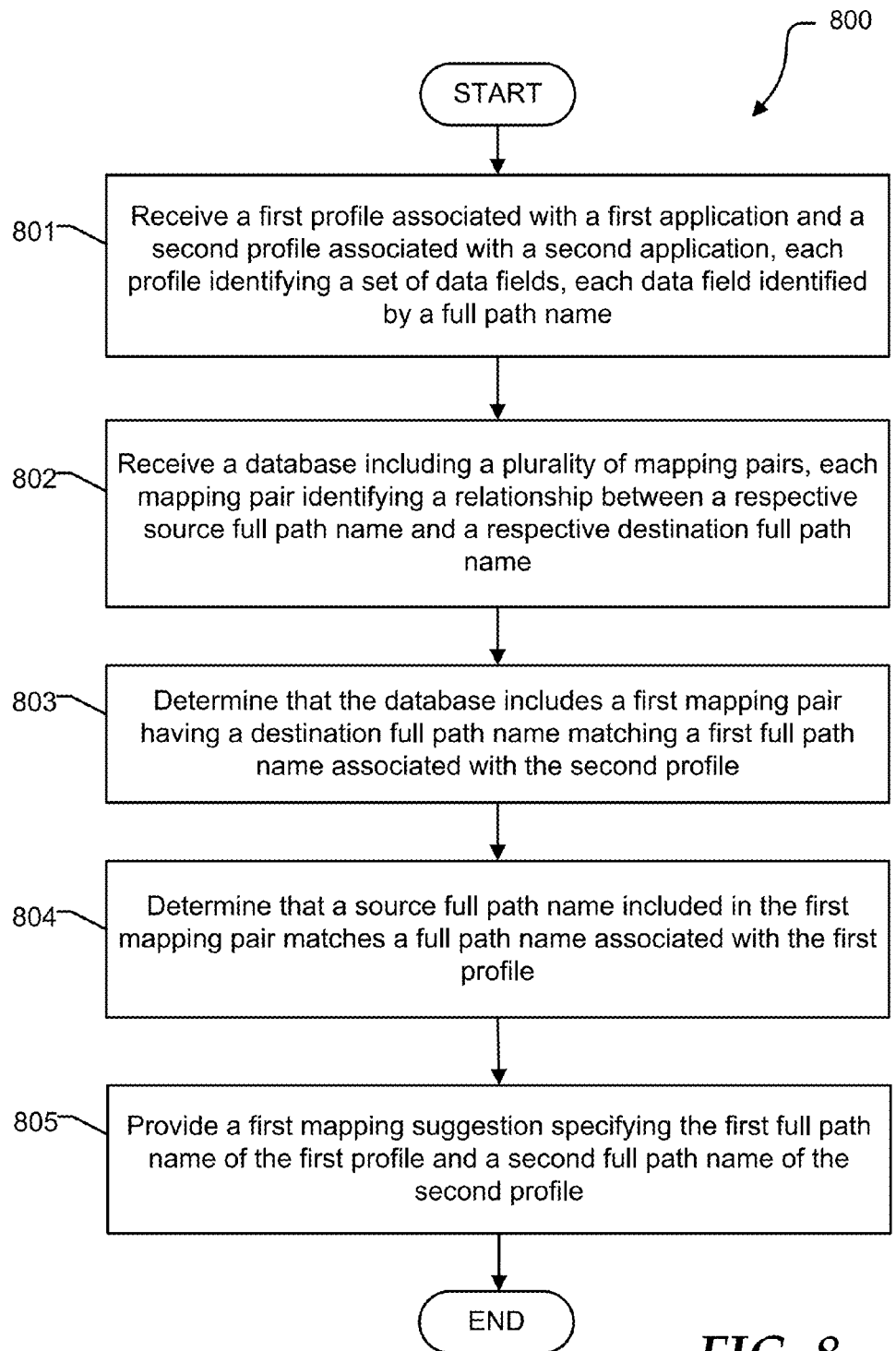
FIG. 8 is a flow diagram illustrating a method for providing full path mapping suggestions according to an embodiment of the present disclosure.

FIG. 8 shows a method 800 for providing full path mapping suggestions in accordance with an embodiment of the present disclosure. The method 800 can be implemented by the suggest engine 411 of FIG. 4. The flow begins at block 801 where a first profile associated with a first application and a second profile associated with a second application are received. Each profile identifies a set of data fields and each data field is identified by a full path name. For example, the data map automation system 400 can be tasked with mapping data fields from one application with data fields to another application. The flow proceeds to block 802 where a full path mapping database including a plurality of mapping pairs is received. Each mapping pair identifies a relationship between a respective source full path name and a respective destination full path name. The full path mapping database can be included at the mapping database 420, and can include a collection of data field associations identified in one or more data maps. For example, the mapping database 420 can include mapping pairs derived from profile maps registered by many users of the system 400, predefined profiles maps, or the like. In an embodiment, the database does not include information associating a mapping pair with the applications containing the respective data fields. In other words, a mapping suggestion provided by the suggest engine 411 is not influenced by the identity of the applications associated with the first and second profiles.

The flow proceeds to block 803 where the suggest engine 411 determines that the database includes a first mapping pair having a destination full path name matching a first full path name associated with the second profile. For example, if a data field at the second profile is represented by the string:
CLIENT,CONTACT,ADDRESS,STATE;
then the suggest engine can search for a mapping pair having a destination string that matches the string of interest. For example, the mapping string:
CONTACT_STATE→CLIENT,CONTACT,ADDRESS, STATE;
identifies an association between a source variable CONTACT_STATE and a destination variable CLIENT,CONTACT,ADDRESS,STATE and therefore matches the first full path name of the second profile.

The flow proceeds to block 804 where the suggest engine 411 determines that a source full path name included in the first mapping pair matches a full path name associated with the first profile. For example, the suggest engine 411 can determine that the string CONTACT_STATE matches a full path name in the first profile. The flow proceeds to block 805 where the suggest engine 411 can provide a first mapping suggestion specifying the first full path name of the first profile and a second full path name of the second profile, for example the suggested mapping:
CONTACT_STATE→CLIENT,CONTACT,ADDRESS, STATE;

represents a suggestion that the data field CONTACT_STATE of the first profile might be mapped to the data field CLIENT, CONTACT,ADDRESS,STATE of the second profile. If the mapping database includes other mapping pairs that specify alternative mappings between variables in the source and destination profiles, the suggest engine 411 can provide a prioritized list of mapping suggestions, the priority assigned to each of the proposed mappings based on predetermined ranking criteria. For example, mapping suggestions can be ranked based on how frequently respective mappings have been selected and implemented by other users of the process development module 410. The number of times that a particular mapping pair has been submitted to a mapping database can be identified using a frequency attribute corresponding to each mapping pair.

Figure 9:
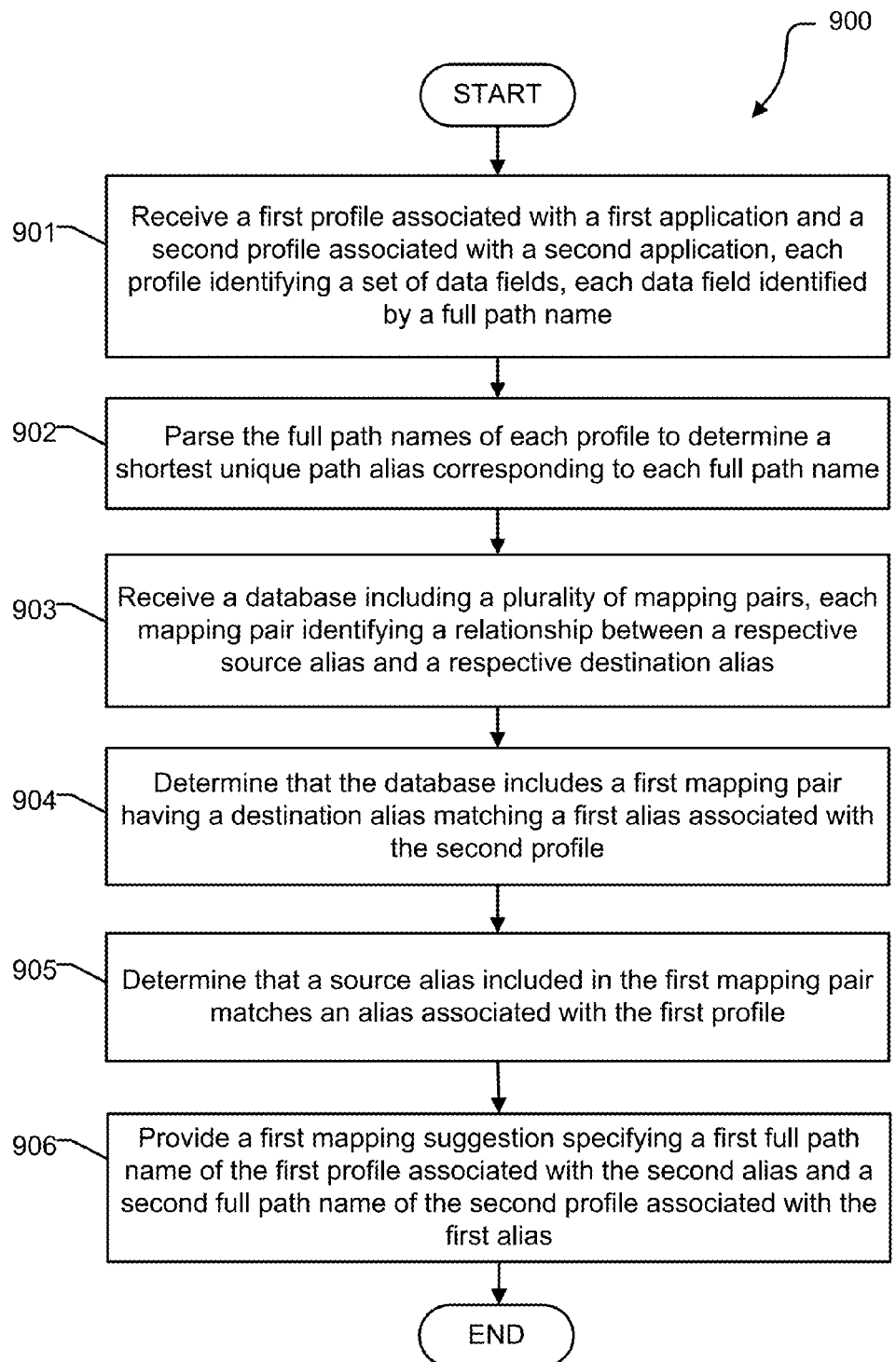
FIG. 9 is a flow diagram illustrating a method for providing shortest unique path mapping suggestions according to an embodiment of the present disclosure.

FIG. 9 shows a method for providing shortest unique path mapping suggestions according to an embodiment of the present disclosure. The method 900 can be implemented by the suggest engine 411 of FIG. 4. The flow begins at block 901 where a first profile associated with a first application and a second profile associated with a second application is received. Each profile identifies a set of data fields and each data field is identified by a full path name. The flow proceeds to block 902 where the suggest engine 411 parses the full path names of each profile to determine a shortest unique path alias corresponding to each full path name. As used herein, a shortest unique path corresponding to each full path name is determined by removing as many left-most justified sub-strings as possible without creating ambiguity with another shortest unique path name of another data field of the same profile. For example, the shortest unique path names (aliases) associated with the full path name examples above are:

CONTACT,NAME;

CONTACT,ADDRESS,STATE;

COMPANY,NAME; and

COMPANY,ADDRESS,STATE

As can be seen in this example, the sub-string CLIENT can be removed from the left side of each full path name without creating a duplicate alias, whereas removing any additional sub-strings, for example CONTACT or COMPANY would result in duplicate, and therefore ambiguous, aliases ADDRESS,STATE and NAME. Therefore, these aliases are referred to as shortest unique paths. Aliases corresponding to each full path name included in the first profile are generated in a similar manner. The suggest engine 411 maintains a one-to-one correspondence between each shortest unique path alias and a respective full path name included in the respective application profiles.

At block 903, a shortest unique path mapping database including a plurality of mapping pairs is received. Each mapping pair identifies a relationship between a respective source alias and a respective destination alias. The shortest unique path mapping database can be included at the mapping database 420, and can include a collection of mapping pairs, each mapping pair identifying an association between two aliases. Like the full path database, in an embodiment the shortest unique path database does not include information associating a mapping pair with the applications containing the respective data fields. The flow proceeds to block 904 where the suggest engine 411 determines that the database includes a first mapping pair having a destination alias matching a first alias associated with the second profile (destination alias).

For example, the shortest unique path database may include a mapping pair:

CONTACT_STATE→CONTACT,ADDRESS,STATE;

where the destination alias of the mapping pair CONTACT, ADDRESS,STATE matches a destination alias associated with the second profile.

The flow proceeds to block 905 where the suggest engine 411 determines that a source alias included in the first mapping pair matches an alias associated with the first profile. For example, the source alias of the mapping string in the present example is CONTACT_STATE. The suggest engine 411 compares this alias to the set of source aliases prepared at block 902. In the present example, the source alias CONTACT_STATE happens to be the same as the full path name of the source data field. The flow proceeds to block 906 where a first mapping suggestion is provided, the suggestion specifying a mapping between a first full path name of the first profile associated with the second alias and a second full path name of the second profile associated with the first alias. For example, the suggest engine 411 can suggest the mapping:

CONTACT_STATE→CLIENT,CONTACT,ADDRESS, STATE;

based on the identified shortest unique path mapping pair. In other words, the source alias CONTACT_STATE corresponds to the original full path name CONTACT_STATE and the destination alias CONTACT,ADDRESS,STATE corresponds to the original full path name CLIENT,CONTACT, ADDRESS,STATE. Therefore, the suggested mapping is expressed using the original full path names included at each profile.

Figure 10:
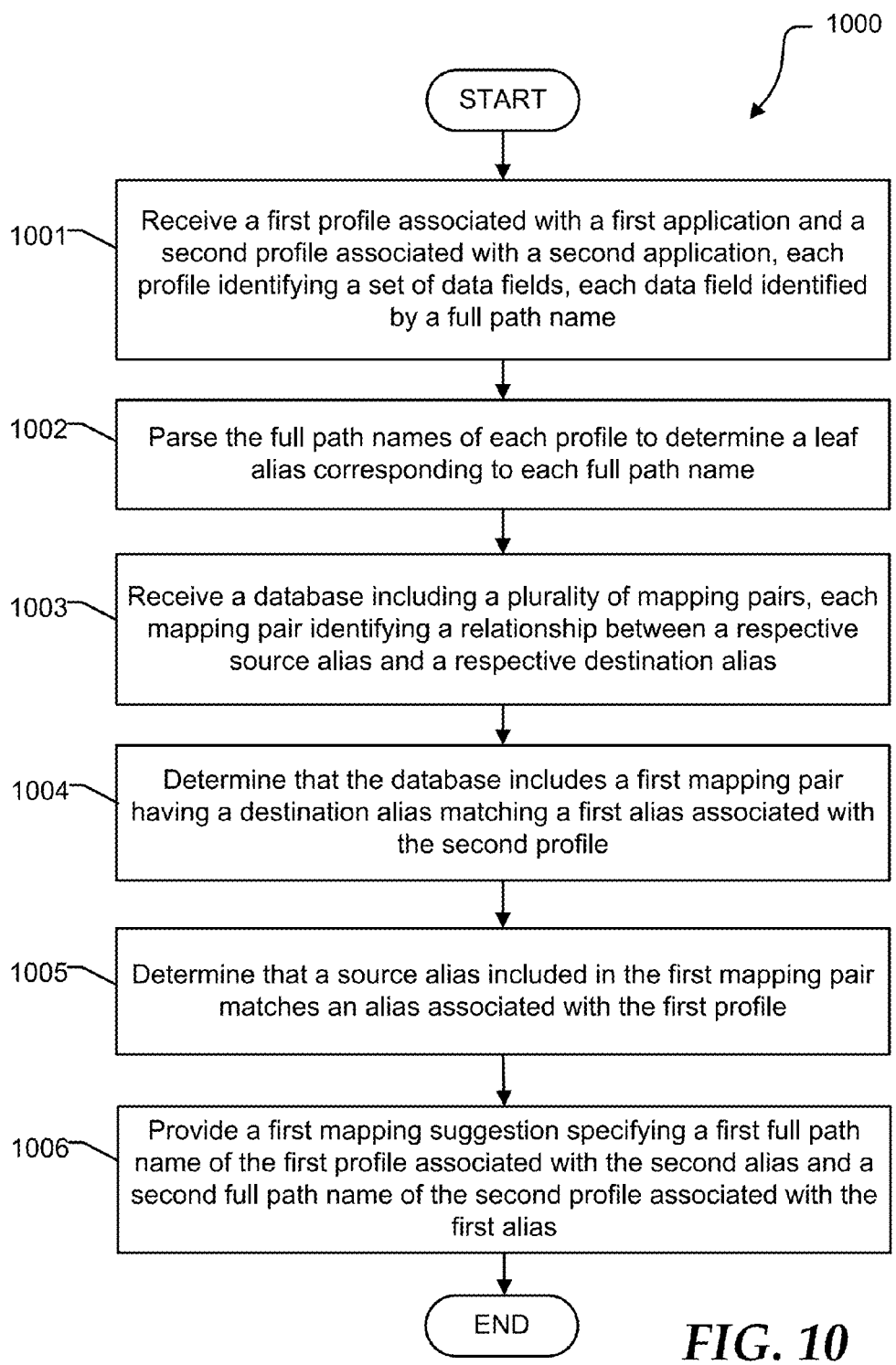
FIG. 10 is a flow diagram illustrating a method for providing leaf path mapping suggestions according to an embodiment of the present disclosure.

FIG. 10 shows a method for providing leaf path mapping suggestions according to an embodiment of the present disclosure. The method 1000 can be implemented by the suggest engine 411 of FIG. 4. The flow begins at block 1001 where a first profile associated with a first application and a second profile associated with a second application are received. Each profile identifies a set of data fields and each data field is identified by a full path name. The flow proceeds to block 1002 where the full path names of each profile are parsed to determine a leaf alias corresponding to each full path name. A leaf path corresponding to each full path name is determined by removing all of the left-most justified sub-strings until only a single leaf substring remains. Only unique leaf aliases are retained. For example, leaf aliases associated with the full path names in the previous example are:

NAME;

STATE;

NAME; and

STATE

None of the leaf aliases generated based on the full path names of the example above is unique, and therefore all of these leaf aliases are discarded. However, if the second profile includes another full path name:

CLIENT,COMPANY,MARKET;

and no other full path name ends with the substring MARKET, then the leaf alias MARKET can be used to represent the original full path variable name. Aliases corresponding to each full path name included in the first profile are generated in a similar manner. The suggest engine 411 maintains a one-to-one correspondence between each leaf path alias and a respective full path name included in the application profiles.

The flow proceeds to block 1003 where a leaf path mapping database including a plurality of mapping pairs is received. The leaf path mapping database can be included at the mapping database 420, and can include a collection of alias associations. Each mapping pair identifies a relationship between a respective source leaf alias and a respective destination leaf alias. Like the full path database, in an embodiment the leaf path database does not include information associating a mapping pair with the applications containing the respective data fields. The flow proceeds to block 1004 where the suggest engine 411 determines that the database includes a first mapping pair having a destination alias matching a first alias associated with the second profile. For example, the leaf path database may include a mapping pair:

COMPANY_MARKET→MARKET

The flow proceeds to block 1005 where the suggest engine 411 determines that a source alias included in the first mapping pair matches an alias associated with the first profile. For example, the suggest engine can determine whether the first profile includes a full path name represented by a leaf alias COMPANY_MARKET. The flow proceeds to block 1006 where a first mapping suggestion is provided, the suggestion specifying a mapping between a first full path name of the first profile associated with the second alias and a second full path name of the second profile associated with the first alias. In an embodiment, a suggestion is not provided if a respective leaf alias is determined to be too common. For example, a frequency table can be maintained at the mapping database 420 that identifies how often the leaf alias has been identified at profile maps previously registered at the system 400.

In another embodiment, the suggest engine 411 can provide a mapping suggestion without guidance provided by a mapping database. For example, this can be done if the suggest engine 411 was unable to provide any suggestions based on full path mapping, shortest unique path mapping, and leaf mapping, or if the number of recommendations provided based on the mapping databases were too few in number. In this situation, the suggest engine 411 can determine whether an exact match can be identified between a full path variable name in the first profile and second profile. Similarly, the suggest engine 411 can determine whether a shortest unique path alias associated with the first profile exactly matches a shortest unique path alias associated with the second profile. If a match is identified, the suggest engine 411 can suggest a mapping between the full path names associated with each alias. The same procedure can be used to provide a mapping suggestion if a leaf alias associated with the first profile exactly matches a leaf alias associated with the second profile.

Mapping suggestions determined using the above techniques can be presented to a user of the system 400 as a prioritized list based on desired weighting criteria. For example, a mapping suggestion based on a mapping pair identified at a full path database can be presented with a higher confidence than another mapping suggestion based on a mapping pair identified at a shortest unique path database. Alternatively, a mapping suggestion determined based on a mapping pair identified at a shortest unique path database can be presented with higher confidence than another mapping suggestion determined based on a mapping pair identified at a full path database if a frequency attribute associated with the former exceeds a corresponding attribute associated with the latter. As used herein, a frequency attribute identifies how many times a particular mapping has been registered at the mapping database 420. For example, if twenty-five profile maps registered at the mapping database each included an identical mapping pair, that mapping pair can include a frequency attribute having a value of twenty-five. In an embodiment, a potential mapping suggestion can be provided or withheld based on predetermined filtering criteria. For example, the suggest engine 411 can elect to disregard a mapping pair having a frequency attribute that is less than a predetermined value. Similarly, a mapping pair may result in a mapping suggestion only if a value of a corresponding frequency attribute, expressed as a percentage of the sum of frequency attributes associated with all applicable mapping pairs, exceeds a predetermined minimum value.

Figure 11:
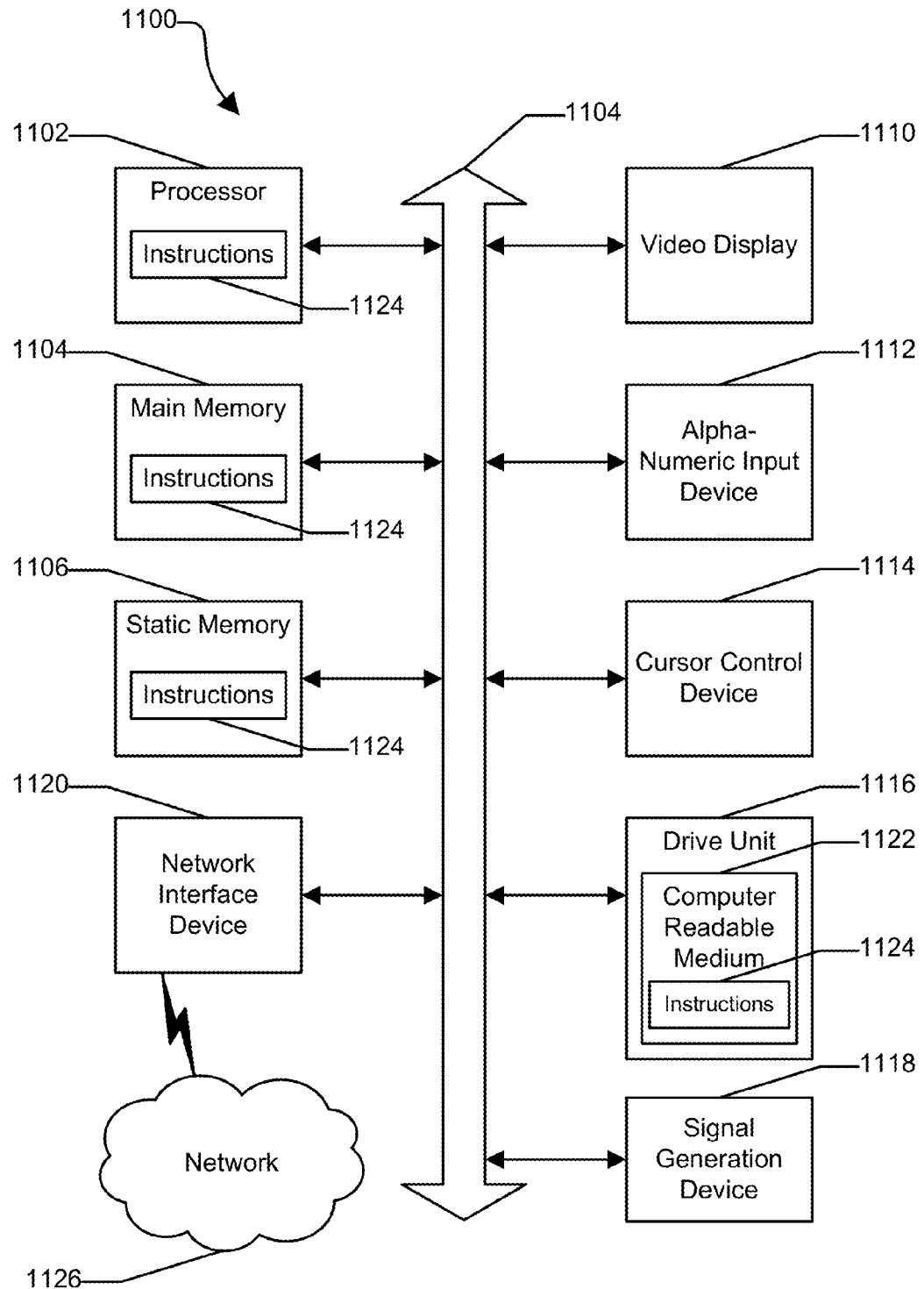
FIG. 11 illustrates a block diagram of an information handling system according to and embodiment of the present disclosure.

FIG. 11 shows an information handling system 1100 capable of administering each of the specific embodiments of the present disclosure. The information handling system 1100 can represent the user device 20, the systems 30, 60, 70, and 80 of FIG. 1, the automation system 400 of FIG. 4, or another data processing device associated with the business network system 10. The information handling system 1100 may include a processor 1102 such as a central processing unit (CPU), a graphics processing unit (GPU), or both. Moreover, the information handling system 1100 can include a main memory 1104 and a static memory 1106 that can communicate with each other via a bus 1108. As shown, the information handling system 1100 may further include a video display unit 1110, such as a liquid crystal display (LCD), an organic light emitting diode (OLED), a flat panel display, a solid state display, or a cathode ray tube (CRT). Additionally, the information handling system 1100 may include an input device 1112, such as a keyboard, and a cursor control device 1114, such as a mouse. The information handling system 1100 can also include a disk drive unit 1116, a signal generation device 1118, such as a speaker or remote control, and a network interface device 1120. The information handling system 1100 can represent a server device whose resources can be shared by multiple client devices, or it can represent an individual client device, such as a desktop personal computer.

The information handling system 1100 can include a set of instructions that can be executed to cause the computer system to perform any one or more of the methods or computer based functions disclosed herein. The computer system 1100 may operate as a standalone device or may be connected such as using a network, to other computer systems or peripheral devices.

In a networked deployment, the information handling system 1000 may operate in the capacity of a server or as a client user computer in a server-client user network environment, or as a peer computer system in a peer-to-peer (or distributed) network environment. The information handling system 1100 can also be implemented as or incorporated into various devices, such as a personal computer (PC), a tablet PC, a set-top box (STB), a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single information handling system 1100 is illustrated, the term "system" shall also be taken to include any collection of systems or sub-systems that individually or jointly execute a set, or multiple sets, of instructions to perform one or more computer functions.

The disk drive unit 1116 may include a computer-readable medium 1122 in which one or more sets of instructions 1124 such as software can be embedded. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the information handling system 1100. The main memory 1104 and the processor 1102 also may include computer-readable media. The network interface device 1120 can provide connectivity to a network 1126, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1124 or receives and executes instructions 1124 responsive to a propagated signal; so that a device connected to a network 1126 can communicate voice, video or data over the network 1126. Further, the instructions 1124 may be transmitted or received over the network 1126 via the network interface device 1120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   receiving a first profile associated with a first application and a second profile associated with a second application, each profile identifying a set of data fields, each data field identified by a corresponding full path name;
   parsing each full path name of each data field of each profile to determine a corresponding shortest unique path alias by truncating as many left-most justified delimiter-separated sub-strings included in the full path name as possible without creating ambiguity with another truncated full path name of the same profile;
   receiving a database including a plurality of mapping pairs, each mapping pair identifying a relationship between a respective source alias and a respective destination alias;
   determining using a computer that the database includes a first mapping pair having a destination alias matching a first shortest unique path alias associated with the second profile;
   determining that a source alias included in the first mapping pair matches a second shortest unique path alias associated with the first profile; and
   providing a first mapping suggestion specifying a first full path name of a first data field of the first profile corresponding to the second shortest unique path alias and a second full path name of a first data field of the second profile corresponding to the first shortest unique path alias, wherein the first mapping suggestion includes a data manipulation operation identifying a manipulation of data associated with the first data field of the first profile.

2. The method of claim 1 further comprising:
   determining that the database includes a second mapping pair having a destination alias matching the first shortest unique path alias associated with the second profile;
   determining that a source alias included in the second mapping pair matches a third shortest unique path alias associated with the first profile; and
   providing a second mapping suggestion specifying a second full path name of the first profile corresponding to the third shortest unique path alias and the second full path name of the second profile corresponding to the first shortest unique path alias.

3. The method of claim 2 wherein the first mapping suggestion is assigned a first confidence attribute based on frequency information associated with the first mapping pair and the second mapping suggesting is assigned a second confidence attribute based on frequency information associated with the second mapping pair, wherein the frequency information is indicative of how many times a respective mapping pair has been submitted to the database.

4. The method of claim 3 wherein the database includes a collection of mapping pairs identified in a plurality of profile maps submitted to the database.

5. The method of claim 1 wherein the first mapping pair does not include information identifying an application associated with the source alias or information identifying an application associated with the destination alias.

6. The method of claim 1 further comprising:
parsing each full path name of each profile to determine a corresponding leaf alias consisting of a right-most justified substring of the full path name;
receiving a leaf database including a plurality of mapping pairs, each mapping pair identifying a relationship between a respective source alias and a respective destination alias;
determining that the leaf database includes a second mapping pair having a destination alias matching a leaf alias associated with the second profile;
determining that a source alias included in the second mapping pair matches a second leaf alias associated with the first profile; and
providing a second mapping suggestion specifying a first full path name of the first profile corresponding to the second leaf alias and a second full path name of the second profile corresponding to the first leaf path alias.

7. The method of claim 1 further comprising providing a system integration application program based on the providing, the system integration application program to provide an interface for communicating information between the first application the second application.

8. The method of claim 1 wherein the data manipulation operation identifies a string manipulation to generate a value associated with the data field identified by the second full path name based on a value associated with the data field identified by the first full path name.

9. The method of claim 1 wherein the data manipulation operation identifies a numerical manipulation to generate a value associated with the data field identified by the second full path name based on a value associated with the data field identified by the first full path name.

10. The method of claim 1 wherein the data manipulation operation is specified by a program script, the manipulation to generate a value associated with the data field identified by the second full path name based on a value associated with the data field identified by the first full path name.

11. A method comprising:
receiving a first profile associated with a first application and a second profile associated with a second application, each profile identifying a set of data fields, each data field identified by a corresponding full path name;
identifying using a computer associations between data fields of the first profile and data fields of the second profile based on mapping pairs included in a full path mapping database;
parsing each full path name of each data field of the first profile and of the second profile to determine a corresponding shortest unique path alias, wherein the shortest unique path alias corresponding to each full path name of a profile is determined by truncating as many left-most justified delimiter-separated sub-strings included in the full path name as possible without creating ambiguity with another truncated full path name of the same profile;
identifying associations between data fields of the first profile and data fields of the second profile based on mapping pairs included in a shortest unique path mapping database; and
providing a prioritized list of mapping suggestions based on the identified associations, wherein a first mapping suggestion includes a data manipulation operation identifying a manipulation of data associated with the first data field of the first profile.

12. The method of claim 11 wherein providing the prioritized list further comprises determining a relative priority of the mapping suggestions based on frequency information stored at each database, the frequency information indicative of how many times a respective mapping pair has been submitted to the respective database.

13. The method of claim 11 wherein identifying associations based on mapping pairs included in a full path mapping database further comprises:
receiving a first database including a plurality of mapping pairs, each mapping pair identifying a relationship between a respective source alias and a respective destination alias;
determining that the first database includes a first mapping pair having a destination full path name matching a first full path name associated with the second profile; and
determining that a source full path name included in the first mapping pair matches a second full path name associated with the first profile.

14. The method of claim 11 wherein identifying associations based on mapping pairs included in a shortest unique path mapping database further comprises:
parsing each full path name of each profile to determine a shortest unique path alias corresponding to each full path name;
receiving a first database including a plurality of mapping pairs, each mapping pair identifying a relationship between a respective source alias and a respective destination alias;
determining that the first database includes a first mapping pair having a destination alias matching a first shortest unique path alias associated with the second profile; and
determining that a source alias included in the first mapping pair matches a second shortest unique path alias associated with the first profile.

15. The method of claim 11 further comprising identifying associations between data fields of the first profile and data fields of the second profile based on mapping pairs included in a leaf mapping database, the identifying comprising:
parsing each full path name of each profile to determine a corresponding leaf alias consisting of a right-most justified substring of the full path name;
receiving a leaf database including a plurality of mapping pairs, each mapping pair identifying a relationship between a respective source alias and a respective destination alias;
determining that the leaf database includes a first mapping pair having a destination alias matching a leaf alias associated with the second profile; and
determining that a source alias included in the first mapping pair matches a second leaf alias associated with the first profile.

16. The method of claim 1 further comprising:
providing a prioritized list of mapping suggestions, a relative priority of the mapping suggestions based on frequency information stored at each database, the frequency information indicative of how many times a respective mapping pair has been submitted to the database.

17. The method of claim 11 further comprising providing a system integration application program based on the providing, the system integration application program to provide an interface for communicating information between the first application the second application.

18. The method of claim 11 wherein the data manipulation operation identifies a string manipulation or a numerical operation to generate a value associated with a data field identified by the second full path name based on a value associated with the data field identified by the first full path name.

19. A system comprising:

a memory; and a processor for executing instructions stored in the memory to perform a method comprising:

receiving a first profile associated with a first application and a second profile associated with a second application, each profile identifying a set of data fields, each data field identified by a corresponding full path name;

parsing each full path name of each data field of each profile to determine a corresponding shortest unique path alias by truncating as many left-most justified delimiter-separated sub-strings included in the full path name as possible without creating ambiguity with another truncated full path name of the same profile;

receiving a database including a plurality of mapping pairs, each mapping pair identifying a relationship between a respective source alias and a respective destination alias;

determining that the database includes a first mapping pair having a destination alias matching a first shortest unique path alias associated with the second profile;

determining that a source alias included in the first mapping pair matches a second shortest unique path alias associated with the first profile; and providing a first mapping suggestion specifying a first full path name of a first data field of the first profile corresponding to the second shortest unique path alias and a second full path name of a first data field of the second profile corresponding to the first shortest unique path alias, wherein the first mapping suggestion includes a data manipulation operation identifying a manipulation of data associated with the first data field of the first profile.

20. The method of claim 1 wherein creating ambiguity with another truncated full path name of the same profile comprises creating a truncated full path name that is identical to another truncated full path name.

* * * * *